(12) United States Patent
Van Den Enden

(10) Patent No.: US 7,215,619 B1
(45) Date of Patent: May 8, 2007

(54) METHOD OF SCANNING A RECORDING DISC FOR DEFECTS, AND RECORDING DEVICE FOR RECORDING INFORMATION ON A DISC-SHAPED RECORDING MEDIUM

(75) Inventor: Gijsbert Joseph Van Den Enden, Veldhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 517 days.

(21) Appl. No.: 09/787,096

(22) PCT Filed: Jul. 12, 2000

(86) PCT No.: PCT/EP00/06619

§ 371 (c)(1),
(2), (4) Date: Mar. 13, 2001

(87) PCT Pub. No.: WO01/06510

PCT Pub. Date: Jan. 25, 2001

(30) Foreign Application Priority Data

Jul. 15, 1999 (EP) .................................. 99202323

(51) Int. Cl.
*G11B 7/00* (2006.01)

(52) U.S. Cl. ..................... 369/53.15; 369/44.33

(58) Field of Classification Search ............ 369/53.15, 369/53.16, 53.17, 30.13, 53.28
See application file for complete search history.

(56) References Cited

U.S. PATENT DOCUMENTS

| | | | | | |
|---|---|---|---|---|---|
| 4,406,000 | A | * | 9/1983 | Shoji et al. | 369/44.25 |
| 4,414,655 | A | * | 11/1983 | Shoji et al. | 369/44.25 |
| 4,730,290 | A | * | 3/1988 | Takasago et al. | 369/30.21 |
| 4,821,251 | A | * | 4/1989 | Hosoya | 369/30.24 |
| 5,218,590 | A | * | 6/1993 | Miyasaka | 369/47.13 |
| 5,237,553 | A | * | 8/1993 | Fukushima et al. | 369/53.17 |
| 5,623,470 | A | * | 4/1997 | Asthana et al. | 369/47.49 |
| 5,818,804 | A | * | 10/1998 | Obata et al. | 369/44.32 |
| 6,058,085 | A | * | 5/2000 | Obata | 369/53.17 |
| 6,084,836 | A | * | 7/2000 | Kamiyama | 369/44.41 |
| 6,205,099 | B1 | * | 3/2001 | Sasaki et al. | 369/53.17 |
| 6,493,302 | B2 | * | 12/2002 | Takahashi | 369/53.15 |
| 6,621,782 | B1 | * | 9/2003 | Nakane et al. | 369/53.1 |

FOREIGN PATENT DOCUMENTS

| | | | | |
|---|---|---|---|---|
| EP | 397126 | A | * | 11/1990 |
| EP | 606499 | A1 | * | 7/1994 |
| EP | 0798716 | A2 | | 10/1997 |
| EP | 798716 | A2 | * | 10/1997 |
| JP | 01253638 | A | * | 10/1989 |
| JP | 02184745 | A | * | 7/1990 |
| JP | 05342638 | A | * | 12/1993 |
| JP | 06068502 | A | * | 3/1994 |
| JP | 06176390 | A | * | 6/1994 |
| JP | 06195718 | A | * | 7/1994 |
| JP | 07201042 | A | * | 8/1995 |
| JP | 08147739 | A | * | 6/1996 |
| JP | 09102173 | A | * | 4/1997 |

* cited by examiner

OTHER PUBLICATIONS

Translation of Tsuchiya et al., Defect Inspection Device for a Disc_Shaped Optical Recording Medium, JP-01253638, Published Oct. 9, 1989.*

*Primary Examiner*—Andrea Wellington
*Assistant Examiner*—Peter Vincent Agustin

(57) ABSTRACT

A method and a DVR video recorder for recording real time video signals on a DVR disc, include detecting large spot disc defects. The integrity of predetermined test tracks is assessed on the basis of a tracking signal. When a defective test track is found, the proximity of the test track is examined further. If the number of affected tracks appears to be small, recording in these tracks is allowed. If the number of affected tracks appears to be large, these tracks are entered in a defect list, which may be recorded on the disc. During recording, the tracks appearing in the defect list are skipped.

19 Claims, 3 Drawing Sheets

METHOD OF SCANNING A RECORDING DISC FOR DEFECTS, AND RECORDING DEVICE FOR RECORDING INFORMATION ON A DISC-SHAPED RECORDING MEDIUM

The present invention generally relates to recording information on a disc-shaped recording medium of the type having recording tracks. Embodiments disclosed herein have recording tracks that may take the form of individual circular tracks or of one continuous spiral track. Tracks can be divided into logic blocks with each block having a data area for the recording of data. Additional embodiments provide for each block to potentially have an area reserved for the recording of a check number or "check sum".

In general, the amount of information to be recorded in a recording session is greater than one block. The information to be recorded, also referred as "file", is then divided into successive data packets having the size of one block, and the successive data packets of a file are recorded in different blocks of the disc. For a rapid data transfer it is then desirable that the successive data packets are recorded in successive blocks. The recording process can then proceed virtually continuously. Likewise, during the subsequent reading (playback) of the information recorded on the disc the read process can proceed continuously.

In practice, a disc may exhibit defects as a result of which information cannot, or at least not reliably, be recorded at the location of the defect. The defects may be caused by material defects in the disc or surface flaws of the disc. The blocks affected by the defect are then no longer suitable for recording.

The defects may be of a very local nature and may be confined to a small portion of only one block, which defects will be referred to hereinafter as "point defects" but it is likewise possible that a defect occupies a larger portion of the surface area of the recording disc. The last-mentioned defects will be referred to hereinafter as "spot defects".

There are various possibilities of coping with the occurrence of defects in recording discs. A first possibility is to check at regular intervals during the write process whether the information to be recorded has been recorded correctly. This is effected by reading out the recorded information and to compare the information thus read with the source information: if it appears to be impossible to read the information or if the information read deviates from the source information a write error is detected, which is subsequently repaired by repeating the write operation in another recording area of the recording disc. An example of such a read-after-write method is described in U.S. Pat. No. 5,218,590. It is then even possible that the recording disc has certain spare recording areas, which normally are not inscribed but which are only used for re-writing information for which the first write operation failed: an example of this is described in U.S. Pat. No. 5,623,470.

A drawback of such read-after-write methods is that the recording process is slowed down by the verification during the recording process and the possible re-writing of an information packet. Therefore, such methods are suitable only if the speed of the recording process is not a critical factor, for example when the information to be recorded is available in a memory and can simply be retrieved again. Such a situation occurs for example in the case of recording of data from a computer memory.

However, there are situations in which the speed of the recording process, in particular the continuity of the recording process, is a critical factor. Such a situation occurs, for example, in the case of real-time recording of signals having a high information rate, for example audio signals or, in particular, video signals. In order to allow the recording process to be carried out in an undisturbed manner it is desirable that information relating to the location of defective blocks is available prior to the recording process. Said information is then employed during recording and the defective blocks are simply skipped. An example of such a recording process is described in JP-A-09.102.173.

The present invention more particularly relates to a method of acquiring the information for specifying the defect locations. Until now it is customary to acquire said information by recording dummy data on the recording disc during a test session and to read out the recorded dummy data and subsequently compare said data with the source data. It is then customary to examine all the blocks of all the recording tracks on the recording disc in this manner. This has been described clearly in, for example, EP-A 0 798 716. However, such a method has the drawback that it takes much time. This is a drawback particularly in the case of, for example, a video recorder, since a user may expect that a video recorder is ready for recording fairly rapidly after insertion of a new disc.

It is an object of an embodiment to provide a more efficient method of testing a recording disc for defects.

An embodiment proposes a method which is particularly useful in recording systems which intrinsically include a very powerful error correction. Such a recording system is, for example, DVR (Digital Video Recording), which system is known per se and will not be described in more detail here. It is to be noted merely that in DVR a recording layer of a disc is disposed at a comparatively short distance (approximately 0.1 mm) from the disc surface. A laser beam used for writing/reading then has a focus which is situated fairly close to the disc surface which faces the laser source, as a result of which the laser spot formed on this surface is comparatively small. The system is therefore comparatively susceptible to slight disruptions of the disc surface.

The error correction of the DVR system is so powerful that the occurrence of small errors in a comparatively small portions of a block, particularly those caused by point defects, no longer presents a problem. If recording discs intended for DVR would have exclusively point defects, these recording discs should, in fact, not even be examined for the presence of such flaws. However, the disc surface may also exhibit comparatively large substantially continuous two-dimensional defect areas, i.e. so-called spot defects. The affected portion of the block will be larger as the spot defects are larger and the affected portion of a block may even be so large that the error correction system can no longer, or at least not rapidly enough, correct the resulting write errors. It is therefore desirable to know the locations of spot defects which are larger than a predetermined acceptance threshold.

It is an object of another embodiment to provide an efficient method of testing a disc-shaped recording medium, in which defect areas whose physical dimensions are larger than a predetermined threshold size are identified comparatively rapidly while defect areas whose physical dimensions are below said threshold can be ignored.

Another embodiment advantageously utilizes the fact that a spot defect whose dimension in the longitudinal direction of recording track (tangential dimension) is so large that the resulting recording error cannot be corrected by the error correction system and further has such a large dimension in the transverse direction of the recording tracks (radial dimension) that the spot defect extends over many adjacent recording tracks, and based on the recognition of the fact that it is then not necessary examine all the recording tracks individually but that it suffices to examine only a few recording tracks, referred to as test tracks, which are spaced at a comparatively large distance from one another. There is always an area with a comparatively large number of non-examined recording tracks situated between the individual test tracks which have been examined. If during such an examination process no defect is found, this does not mean that the examined disc does not have any defects at all but it will be obvious that a possible defect will then always have a radial dimension smaller than said number of non-examined recording tracks situated between two adjacent test tracks, and that the tangential dimension of such spot defect which is yet present will also be small enough.

Another embodiment further proposes to examine the direct proximity of the test track more closely if a test track is found to exhibit a defect, in order to determine the size of the defect. This can be effected prior to recording but preferably this is effected after the recording, and a suspect area at opposite sides of the test track which is found to be defective is skipped during recording.

In accordance with another embodiment, an acceptable compromise is reached between a comparatively short test time and the reliability of the test.

In the prior art it is customary, as stated, to check for the presence of disc defects on the basis of writing and substantially reading (dummy) data. A drawback of such test methods is that they are quite time-consuming. A further drawback is that such methods cannot be used for write-once recording discs.

It is an object of another embodiment to overcome these problems as well. To this end, it is proposed by to examine a recording track of a recording disc on the basis of the tracking signal. For this purpose, the relevant track on the recording disc is simply followed by a laser beam without information being written into said track or without information being read from said track. If the recording disc has a defect the tracking signal will exhibit identifiable deviations or errors or will even be lost completely. This can be detected in a fairly simple manner. The defect criterion proposed is that the absolute value of the tracking signal exceeds a predetermined threshold level for a predetermined time or longer.

A test method proposed by another embodiment is that no write operation is effected and that the test can be performed very rapidly.

These and other aspects, features and advantages of various embodiments will be elucidated further by means of the following description of a form of a test method in accordance with embodiments with reference to the drawings, in which.

Figure 1:
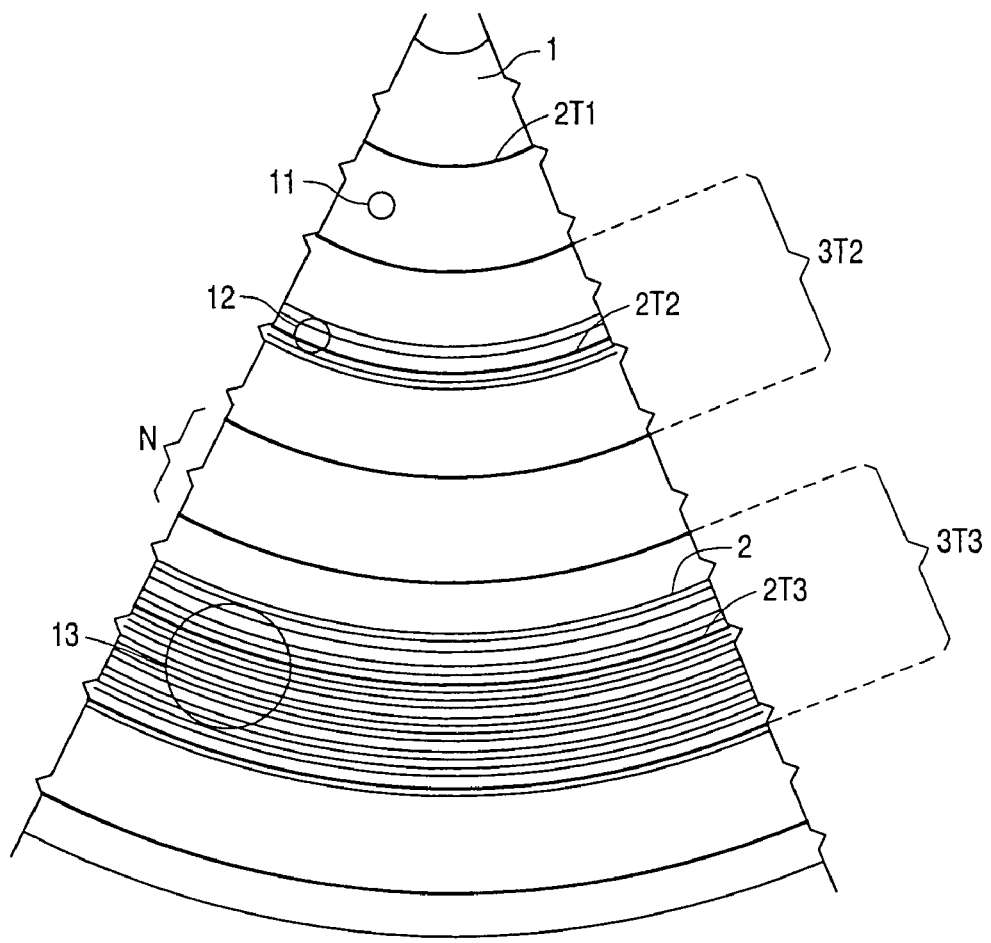
FIG. 1 is a diagrammatic plan view of a part of a disc-shaped recording medium.

FIG. 1 is a diagrammatic plan view of a part of a disc-shaped recording medium 1, for example and in particular an optical recording disc for use in DVR. The disc 1 has a multitude of pre-defined substantially circular recording tracks 2. To illustrate an embodiment, the recording disc 1 in FIG. 1 is shown with three disc defects 11, 12 and 13 in the form of spots. The radial and tangential dimensions of each spot defect are of the same order of magnitude, the spot defects 11, 12 and 13 being represented as substantially circular spots in FIG. 1.

The radial and tangential dimensions of the first spot defect 11 are comparatively small. Consequently, the affected track length of a recording track 2 afflicted with the first spot defect 11 is comparatively small, the number of tracks affected by the first spot defect 11 being also comparatively small. The same applies to the second spot defect 12.

The DVR system has a particularly powerful error correction system so that it is substantially immune to errors produced over a comparatively small track length. Only when the affected track length becomes comparatively large the error correction system will not be able to correct the resulting recording errors. By way of illustration, this is the case with the comparatively large spot defect 13 and it is also apparent from FIG. 1 that the number of recording tracks 2 affected by the comparatively large spot defect 13 is larger than the number of recording tracks affected by the comparatively small spot defects 11 and 12.

In a conventional manner each recording track 2 is tested by writing and reading data, which is very time-consuming. According to another embodiment, it is proposed to examine only a limited number of recording tracks of the disc 1, the tracks to be examined referred to hereinafter as "test tracks 2T". FIG. 1 shows some of these test tracks as comparatively bold lines referenced 2T1, 2T2 etc. Successive test tracks 2T are spaced apart by a predetermined number N of recording tracks. Hereinafter it is assumed by way of example that N is 50. However, it will be evident to one skilled in the art that N may have any other suitably selected value.

Figure 2:
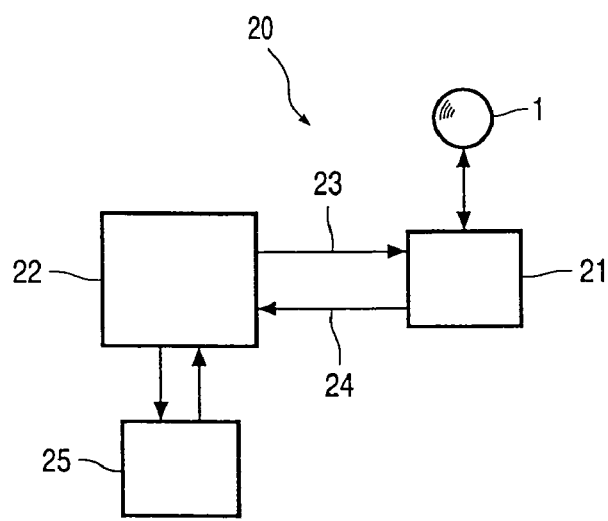
FIG. 2 is a block diagram which illustrates a part of a recording device in which the present invention is embodied.

FIG. 2 diagrammatically illustrates a recording device 20 for recording information such as real-time video signals on a recording disc 1, in which recording device 20 is embodied. The recording device 20, which will also be referred to as "video recorder", has a write/read unit 21 adapted to record information on and to read information from the recording disc 1 under control of a control unit 22. As it is basically possible to use a standard write/read unit for this purpose, this unit will not be described in further detail. It is to be noted merely that the control unit 22 can give commands to the write/read unit 21 via a command line 23, for example the command to carry out a write or read operation and the sequence number of the relevant recording track 2 to which the write or read operation relates.

As is well-known, an optical recording system uses a laser beam for writing information onto a track of the rotating disc 1 and also for reading information from the track on the recording disc 1. The laser beam is then controlled so as to follow the track, as is well-known. For this purpose use is made of a tracking signal based upon the reflection of the laser beam from the track on the disc. If the beam is aimed exactly at the center of the track the tracking signal has a known nominal value; in the following description it will be assumed for the sake of simplicity that this nominal value is zero, but to one skilled in the art it will be evident which adaptations are necessary if the nominal value is non-zero. If the beam is not exactly centered on the track the reflected beam will contain information for controlling a correction movement of the laser beam, as is known per se. For the sake of simplicity it will be assumed in the following description that the value of the tracking signal is proportional to the radial deviation of the laser beam with respect to the track center and that the sign of the tracking signal indicates the direction of the deviation. If the disc has surface defects the tracking signal will deviate or will be lost completely, which can be detected in the write/read unit 21 and/or in the control unit 22, as will be evident to one skilled in the art.

This tracking signal is obtained even if the control unit 22 only instructs the write/read unit 21 to follow a track without information being read or written. The tracking signal of the addressed track is transferred to the control unit 22 by the write/read unit 21 via a signal line 24.

In another embodiment it is assumed in general that a track has a satisfactory integrity if there are no disturbances in the tracking signal over the full length (one full revolution) of a track, or if they appear at the most in a small enough portion of the track; this will be referred to as a "correct track" or "track OK". However, if the tracking signal contains one or more disturbances over a too large part of the track, this will be referred to as "failing track". The lack of track integrity or the track failure, will be regarded as an indication of the presence of a surface defect which affects at least a part of the relevant track. Thus, the tracking signal S is indicative of the presence of a surface defect without a time-consuming write/read/compare cycle being required.

The control unit 22 of the recording device 20 is adapted to carry out a test procedure in accordance with the present invention to ascertain which tracks should not be used for recording because they have been damaged too much, when the video recorder 20 receives a recording command from a user, or even before this, when a disc 1 is loaded into the video recorder 20 for the first time. An example of this procedure will be elucidated with reference to FIGS. 1 and 3.

The test starts in a step 101 when a new recording disc 1 is loaded into the video recorder 20.

In a step 102 the control unit 22 instructs the write/read unit 21 to determine the integrity of the first test track 2T1 to be examined. The sequence number or address of this first test track 2T1 can be 1. The write/read unit 21 aims its laser beam at the first test track 2T1 and follows this track for a full revolution. It will be evident that in this case the presence or absence of data in this said track is not relevant: any data information which may be present is ignored. The test merely aims at examining whether the write/read unit 21 can follow the test track 2T1 without any problems over its full length.

Upon completion of one full revolution of the disc 1, or during this revolution, the control unit 22 checks in a step 103 whether the integrity of the examined test track is OK on the basis of the received tracking signal. If this appears to be the case, as is shown for the first test track 2T1 in FIG. 1, the control unit 22 instructs the write/read unit 21, in a step 104, to move the laser beam by N tracks, and the control unit 22 proceeds to a step 105. N may then have a predetermined fixed value, for example and preferably 50.

In the step 105 it is checked whether the end of the disc has been reached. If this is the case, the test procedure is stopped; if it is not the case, the control unit 22 reverts to the step 103 to test the integrity of the next test track.

Thus, the recording tracks situated between successive test tracks are skipped, i.e. they are not tested. If a spot defect is situated in the intermediate area, such as the first spot defect 11 shown in FIG. 1, this will not be detected.

If in the step 103 it appears that tracking errors have been found, the control unit 22 proceeds to a step 110 to determine the radial dimension of the detected spot defect, which is expressed as the number of tracks 2 affected by this spot defect, which is denoted herein by the letter X (track), where the parameter "track" is the sequence number of the relevant recording track 2. This procedure is followed, for example after scanning of the second test track 2T2 shown in FIG. 1, where a tracking error will occur as a result of the second spot defect 12.

The control unit 22 is adapted to determine subsequently in a step 120 the magnitude of the detected spot defect by comparing the radial dimension X (track) with a predetermined threshold value M. If it is found, as with the second test track 2T2, that the radial dimension X (track) thus determined for the detected spot defect, such as the second spot defect 12, is smaller than the predetermined threshold M, it is decided that the tangential dimension of the detected spot defect is permissible. The affected track length of each of the recording tracks affected by the second spot defect 12, such as the second test track 2T2, is then comparatively small, and the error correction system can handle and correct the resulting write and/or read errors. Thus, although these recording tracks are affected by a spot defect, they are normally released for recording purposes. The control unit 22 now returns to the step 104. A suitable value for M is for example approximately 50.

If in the step 120 it is found, such as in the case of the third test track 2T3, that the radial dimension X (track) found for the detected spot defect, such as the comparatively large third spot defect 13, is not smaller than the predetermined threshold M, it is decided that the tangential dimension of the detected spot defect is impermissibly large. The affected track length of each of the recording tracks affected by the third spot defect 13, such as the third test track 2T3, is so large that the resulting write and/or read errors can no longer be corrected by the error correction system. The control unit 22 then proceeds to a step 130 in order to record the addresses of the relevant tracks affected by the third spot defect 13 in a defect list stored in a memory 25 associated with the control unit 22. After this, the control unit 22 returns to the step 104.

The defect list may take the form of an initially empty memory in which only the sequence numbers or addresses of affected tracks are stored. The defect list may alternatively take the form of a memory having a predetermined number L of storage locations, each storage location corresponding to the sequence number of a given recording track and the content of said storage location being indicative of the relevant recording track being affected or non-affected. It is then adequate if each of the storage locations comprises only one bit.

The recording device 20 is now ready to record information (video signals) on the disc 1. The write process will be substantially identical to a standard write process, with the proviso that the control unit 22 is adapted to read out the defect list in the memory 25 during writing and to skip the recording tracks listed therein. It will be evident that it is thus also possible to record a very rapid information stream, for example a real-time digital video signal, continuously without being troubled by possible spot defects: in the case of comparatively small spot defects the error correction system is activated to correct any errors and in the case of comparatively large spot defects the affected tracks are simply skipped. Moreover, it will be evident that the method of testing the recording tracks of the recording disc, as proposed in accordance with this embodiment, requires a comparatively small amount of time.

The test method proposed by another embodiment for testing the recording tracks of the recording disc may be carried out each time when a new disc 1 is loaded into the apparatus 20. However, it is alternatively possible for the control unit 22 to be adapted to record the defect list on the disc just tested. In that case the control unit 22 may be adapted to check first of all, each time that a new disc 1 is loaded into the apparatus 20, whether already a defect list has been recorded on this disc and, if this is the case, to load it into the memory 25.

In the step 104 the jump of N tracks to be skipped can be made with respect to the test track 2T2 as shown, but this jump can also be made with respect to the track having the highest sequence number, which has been tested in the process of the step 110.

In the step 110 the parameter X (track) can be determined by testing, starting from the relevant test track, all the individual recording tracks having decreasing sequence numbers in a step similar to the step 103 until a recording track without tracking errors is found, and by subsequently testing, again starting from the relevant test track, all the individual recording tracks having increasing sequence numbers until a recording track without tracking errors is found. However, it will also be possible to skip each time a number of tracks or to halve each time the jump between two tracks to be tested, starting from N. It will be evident to one skilled in the art that various efficient search strategies are possible. However, for the sake of simplicity these are not illustrated in the flow chart of FIG. 3.

As already stated, the integrity of the track being examined is determined on the basis of the received tracking signal in the step 103. Although a variety of criteria are conceivable, the present invention proposes a criterion which, on the one hand, can be implemented comparatively simply and, on the other hand, yields a satisfactory reliability. For the criterion proposed by another embodiment it assumed that under normal conditions the tracking signal as a rule does not deviate much from the nominal value which corresponds to the center of the track being examined and that any significant deviations will have only a short duration. Thus, in accordance with this embodiment it is assumed that the track being examined is defective when it is found that a tracking signal, which is indicative of a significant deviation with respect to the center of the track, has an impermissibly long duration.

The tracking signal has a nominal signal value $S_{nom}$ which corresponds to the center of a track; as already stated, it is assumed that $S_{nom}=0$. Furthermore, the absolute value of the tracking signal has a maximum $S_{max}$ which corresponds to a maximum lateral (radial) deviation with respect to the center of a track. A tracking error parameter D is defined as follows by normalizing the absolute value at said maximum:

$$D=|S|/S_{max}$$

Under normal conditions said value will appear more briefly as the tracking error parameter is greater. In accordance with a criterion proposed by another embodiment, the track being tested is considered to be defective if the tracking error parameter is greater than 0.5 for a length of time of 60 μs or longer.

Figure 4:
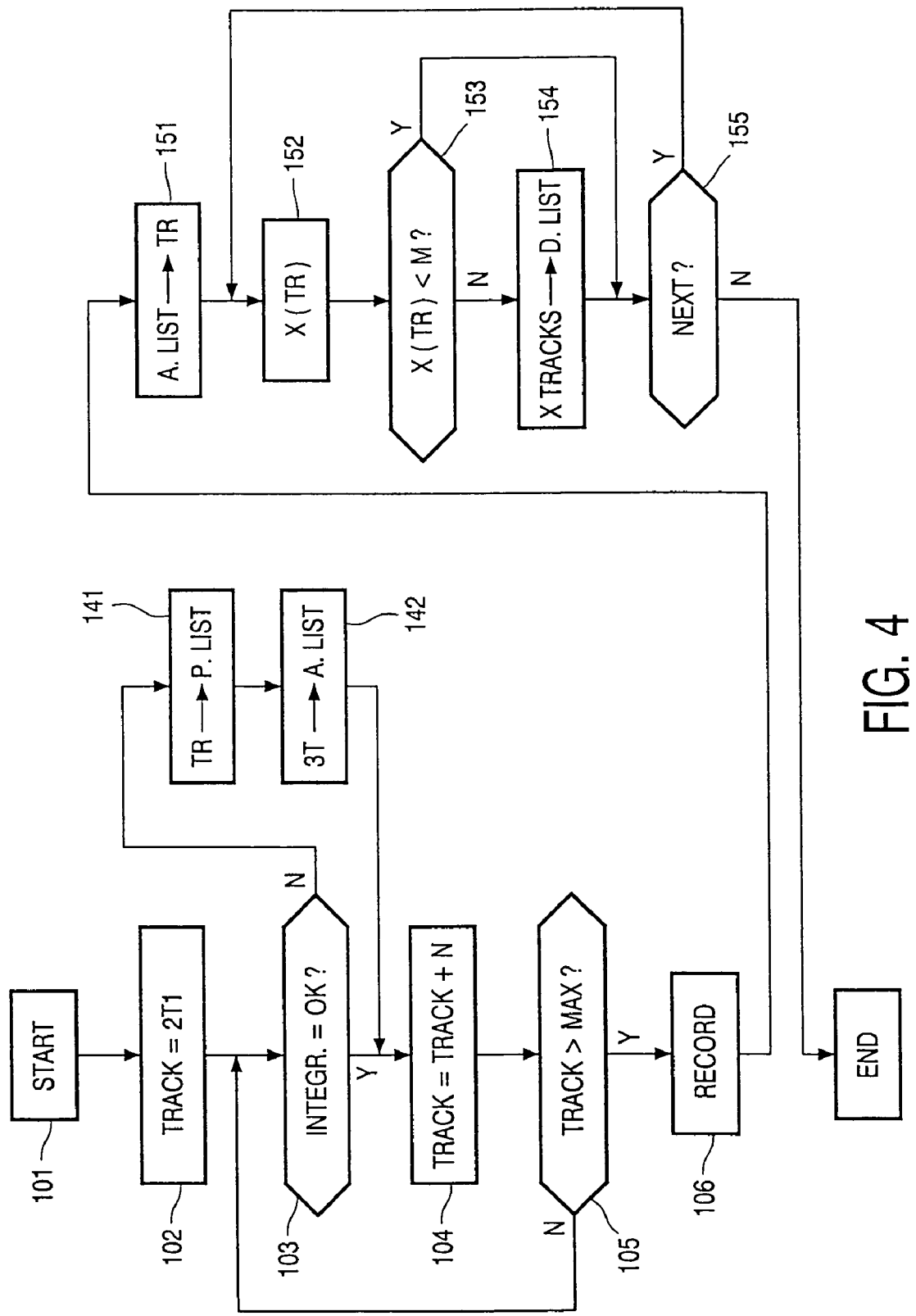
FIG. 4 is a flow chart of another test method in accordance with the invention.

FIG. 4 shows a flow chart of another variant of the test method in accordance with another embodiment. Identical reference numerals refer to identical or similar steps, which will therefore not be described extensively.

If in the step 103 it is found that the track being tested is defective, the sequence number of this track is stored in a list in a step 141, said list being stored in the memory 25 and being referred to as "primary defect list". This is the case, for example, for the second test track 2T2 and the third test track 2T3. Now, in contradistinction to the method described with reference to FIG. 3, it is not determined which adjacent tracks are affected: for the time being it is assumed that all the tracks 2 in the area between the examined test track and the test track directly preceding it are "suspect". This is also assumed for all the tracks 2 in the area between the examined test track and the test track directly following it. These two areas together will be referred to as the "suspect area" 3T; FIG. 1 shows two suspect areas 3T2 and 3T3, which correspond to the test tracks 2T2 and 2T3, respectively. Thus, each suspect area 3T comprises 2N tracks. In a step 142 the suspect area 3T is stored in a list referred to as the "alarm list" in the memory 25.

Although, as explained, a distinction can be made between the test tracks already examined and suspect tracks not yet examined and there may be two different lists, whose contents are treated differently, for the sake of simplicity, the two lists are combined to a single list. In other words: both the test tracks already examined an the suspect tracks not yet examined are stored in one list, which will be referred to as the "alarm list".

Figure 3:
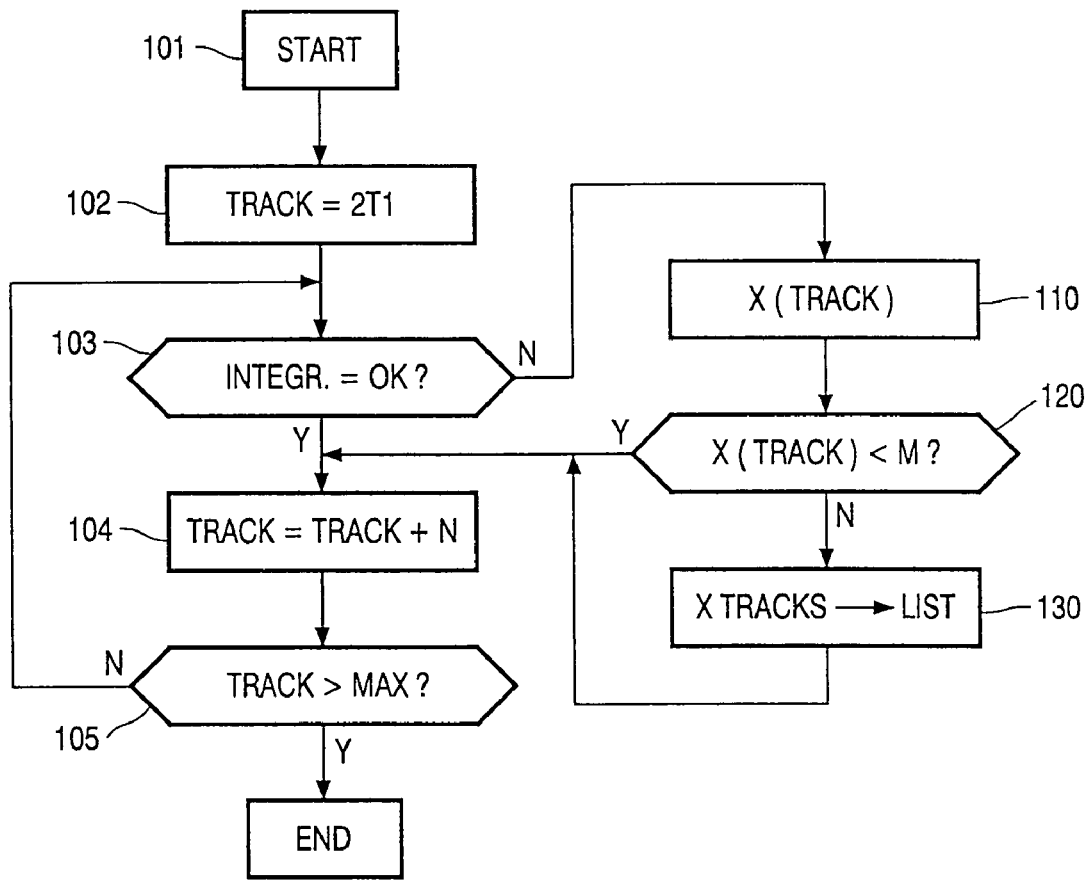
FIG. 3 is a flow chart of a test method in accordance with the invention.

Subsequently, the control unit 22 returns to the step 104. It will be evident that the control unit 22 of the video recorder 20 is now ready much sooner than in the case of the method as illustrated in FIG. 3 because the step 110 described hereinbefore with reference to FIG. 3 is not carried out.

The alarm list (and the primary defect list, if any) can also be implemented by means of an initially empty memory in which only the sequence numbers of the relevant tracks are stored, or by means of a memory having a predetermined number of storage locations, each storage location corresponding to the sequence number of a given recording track.

After the step 105 the video recorder is ready to record information (video signals) on the disc 1 in a step 106. The write process will be substantially identical to a standard write process, with the provision that the control unit 22 is adapted to read out the alarm list (and, if applicable the primary defect list) in the memory 25 during writing, and to skip the recording tracks appearing in said list(s). It will be evident that it is thus also possible to record a very rapid information stream, for example a real-time digital video signal, continuously without being troubled by possible spot defects. For non-detected spot defects, which are comparatively small by definition, the error correction system is activated to correct possible errors. For spot defects that have been detected the affected tracks and the suspect tracks in the vicinity are simply skipped. Furthermore, it will be evident that the method of testing the recording tracks of the recording disc, takes comparatively little time.

In another embodiment, not only tracks which are affected by a comparatively large spot defects 13 are skipped but also tracks which are affected only slightly by a comparatively small spot defects or which are not affected at all are skipped. After completion of the recording in the step 106, when the video recorder 20 need not be immediately ready for further commands from the user, the video recorder 20 has time to examine individual suspect tracks of the alarm list more closely in order to detect the dimensions of the spot defects for each of the test tracks specified in the primary defect list. The procedure then followed may be identical to that described for the steps 110 and 120 of FIG. 3. If both the test tracks and the associated suspect tracks have been stored in the alarm list it is also simple to examine all the tracks specified in this alarm list.

In a step 151 a first track number of a test track is read from the alarm list (or, if applicable, from a primary defect list). In a step 152, similar to the step 110 described hereinbefore, the radial dimension X of the detected spot defect is determined and in a step 153, similar to the step 120 described hereinbefore, said radial dimension X is compared with a predetermined threshold value M. If, as in the case of the third test track 2T3, a detected spot defect 13 is found to be larger than what is deemed permissible, the control unit 22 proceeds to a step 154, similar to the step 130 described hereinbefore, to store the addresses of the relevant affected tracks in a list which will be referred to hereinafter as "secondary defect list" or briefly "defect list". In a step 155 the control unit 22 determines whether there is a following test track in the alarm list (or, when applicable, the primary defect list), and if this is the case the control unit 22 reverts to the step 152.

Upon a subsequent write command the control unit 22 will read the defect list in the memory 25 and will skip the tracks listed there. The defect list may be recorded on the relevant disc 1, thus enabling the test procedure to be skipped during subsequent use of the disc.

In an alternative variant the step 142 is skipped, which means that in the step 141 only the defective test tracks are entered in the list referred to as the "primary defect list". The write process carried out in the step 106 will be substantially identical to a standard write process, with the provision that the control unit 22 is adapted to read the primary defect list in the memory 25 during writing and to skip the suspect areas (3T2; 3T3) which correspond to the test tracks (2T2; 2T3) in this list.

In a further modification, within another embodiment the control unit 22 is adapted to monitor the tracking signal during the write process in a manner as described hereinbefore and to interrupt write process if the tracking signal is found to be indicative of a tracking error which is so large that an adjacent track is likely to be damaged by the write process. The write interrupt criterion proposed is a criterion similar to the criterion for tracking integrity described hereinbefore but now having a higher value for the acceptance threshold. A decision to interrupt the write process is taken more in particular when the tracking error parameter D of the tracking signal is larger than ⅔ for a length of time that lies in a range approximately between 50 µs and 70 µs, and preferably approximately 60 µs.

It will be evident to one skilled in the art that the scope of the present invention is not limited to the examples described hereinbefore but that that various changes and modifications thereto are possible without departing from the scope of the invention as defined in the appended Claims. For example, in another embodiment only predetermined test tracks are examined in the test procedure, even if the test procedure is not based on the use of the tracking signal.

Moreover, in the method described with reference to FIG. 4 it is possible to combine the primary defect list and the alarm list to a single list in the method described with reference to FIG. 4.

The invention claimed is:

1. A method of examining a record carrier for presence of defects comprising the acts of:
   following a track to be examined and monitoring a resulting tracking signal; and
   rating the examined track for the presence of the defects based on characteristics of the resulting tracking signal; and
   determining if recording should be discontinued based on the rating act indicating that the examined track contains defects;
   wherein the examined track is rated as being defective if the resulting tracking signal has a value which exceeds a predetermined threshold for a time period from approximately 50 µs to approximately 75 µs.

2. The method as claimed in claim 1, wherein the tracking signal has a nominal signal value of zero which corresponds to a center of the examined track, and has a maximum value which corresponds to a maximum lateral deviation with respect to the center, and wherein a level of a preselected fraction of said maximum value is chosen as the predetermined threshold.

3. The method as claimed in claim 2, wherein the preselected fraction is approximately 0.5.

4. The method of examining as in claim 1 wherein the record carrier is examined for the presence of spot defects, the method further comprising the acts of:
   a) examining integrity of predetermined test tracks of the record carrier;
   b) examining integrity of tracks adjacent a relevant test track each time that upon the examination a test track appears to be defective, in order to determine in this way the number of tracks affected by the same spot defect;
   c) entering examined tracks in a defect list each time that the number thus determined in the act (b) is greater than a predetermined threshold value;
   d) storing the defect list in a memory.

5. The method as claimed in claim 4, wherein a predetermined number of tracks between successive test tracks is skipped.

6. The method as claimed in claim 4, wherein the defect list is recorded on the examined record carrier.

7. A method of recording information on a record carrier of the type having a multitude of concentric substantially circular recording tracks, the method comprising the acts of:
   first providing, in an examination phase, said defect list by means of the method as claimed in claim 4;
   subsequently recording information on the disc in a recording phase while reference is made to said defect list, the recording tracks included in said defect list being skipped in the recording process.

8. The method of examining of claim 1 wherein the record carrier is examined for the presence of spot defects, the method further comprising the acts of:
   examining the integrity of predetermined test tracks of the record carrier;
   entering defective tracks in a primary defect list each time that upon the examination of a test track it appears to be defective, and entering tracks situated in a suspect area at opposite sides of the defective tracks in an alarm list;
   storing the primary defect list and the alarm list in a memory.

9. The method as claimed in claim 8, wherein a predetermined number of tracks between successive test tracks is skipped, and wherein each suspect area extends from a defective test track to a directly preceding and a directly following test track, respectively.

10. A method of recording information on a record carrier of the type having a multitude of concentric substantially circular recording tracks, the method comprising:
   first providing, in a primary examination phase, said primary defect list and, optionally, an alarm list of tracks situated in a suspect area at opposite sides of the defective tracks, by means of the method as claimed in claim 8;
   subsequently recording information on the disc in a recording phase while reference is made to said primary defect list and said optional alarm list, the recording tracks included in said primary defect list as well as the tracks situated in a suspect area at opposite sides of the defective tracks being skipped in the recording process;

subsequently examining the integrity of the tracks in said suspect areas in a secondary examination phase, in order to determine in this way the number of tracks affected by the same spot defect;

entering the defective tracks in a secondary defect list each time that the number thus determined is greater than a predetermined threshold value.

11. The method as claimed in claim 10, wherein the secondary defect list is recorded on the examined record carrier.

12. The method as claimed in claim 1, wherein said time period is approximately 60 µs.

13. A method of recording information on a record carrier, comprising the acts of:

monitoring a recording track to provide a rating of defects contained on the track; and based on a resulting tracking signal indicating that the track contains a defect, determining whether recording is to be continued or discontinued; wherein the recording track is rated as being defective if the tracking signal has a value which exceeds a predetermined threshold for a time period from approximately 50 µs to approximately 75 µs.

14. The method as claimed in claim 13, wherein the tracking signal has a nominal signal value of zero which corresponds to the center of a track, and has a maximum value which corresponds to a maximum lateral deviation with respect to the center of a track, and wherein a level of a preselected fraction of said maximum value is adopted as the predetermined threshold.

15. The method as claimed in claim 14, wherein the preselected fraction is approximately ⅔.

16. A recording device suitable for recording of information on a record carrier, said recording device comprising:

a control unit;

a write/read unit adapted to aim a laser beam at an examined track of the record carrier under control of the control unit and to receive laser light reflected from the record carrier, and further adapted to supply a tracking signal to the control unit, wherein the tracking signal has been determined based on the reflected laser light; and wherein the control unit is adapted to carry out the method as claimed in claim 13.

17. The method as claimed in claim 13, wherein said time period is approximately 60 µs.

18. A method of examining a record carrier for presence of defects comprising the acts of:

following a track to be examined and monitoring a resulting tracking signal; and rating the examined track for the presence of the defects based on characteristics of the resulting tracking signal;

determining if recording should be discontinued based on the rating act indicating that the examined track contains defects;

examining integrity of predetermined test tracks of the record carrier; and examining integrity of tracks adjacent a relevant test track each time that upon the examination a test track appears to be defective, in order to determine a number of tracks affected by the same spot defect;

wherein approximately 50 tracks between successive test tracks of said predetermined test tracks are skipped.

19. A method of examining a record carrier for the presence of a defect comprising the acts of:

monitoring a track to be examined and generating a tracking signal from the track that is monitored;

rating the track for the presence of spot defects based on characteristics of the tracking signal;

entering the track into a defect list if the track appears to be defective; and creating a suspect area list for other tracks at opposite sides of the track if the track appears to be defective;

wherein the track is rated as being defective if the tracking signal has a value which exceeds a predetermined threshold for a time period from approximately 50 µs to approximately 75 µs.

* * * * *